United States Patent
Tzeng et al.

(10) Patent No.: US 8,320,408 B2
(45) Date of Patent: Nov. 27, 2012

(54) MULTI-CHANNEL CODE-DIVISION MULTIPLEXING IN FRONT-END INTEGRATED CIRCUITS

(75) Inventors: Fred Tzeng, Cerritos, CA (US); Payam Heydari, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 247 days.

(21) Appl. No.: 12/694,998

(22) Filed: Jan. 27, 2010

(65) Prior Publication Data
US 2010/0195669 A1 Aug. 5, 2010

Related U.S. Application Data

(60) Provisional application No. 61/148,325, filed on Jan. 29, 2009.

(51) Int. Cl.
*H04J 13/00* (2011.01)
(52) U.S. Cl. .......................... 370/479; 375/130
(58) Field of Classification Search .................. 370/479; 375/130–153
See application file for complete search history.

(56) References Cited

U.S. PATENT DOCUMENTS

2005/0249298 A1* 11/2005 Kim et al. ..................... 375/260
2006/0193374 A1* 8/2006 Guo et al. ..................... 375/148
* cited by examiner

*Primary Examiner* — Gary Mui
(74) *Attorney, Agent, or Firm* — Dickstein Shapiro LLP; Kenneth S. Roberts (57) ABSTRACT

A challenging problem is maintaining low power consumption in multi-channel (MC) systems, where multiple input signals demand several front-end analog signal-processing blocks to be replicated. A code-division multiplexing (CDM) system can be generalized as a signal compression-decompression involving an analog-to-digital converter (ADC). This invention utilizes CDM in MC front-end integrated circuits to significantly reduce the power consumption of such systems. The invention also extends CDM's data compression advantages to uncorrelated and weakly correlated MC signals through the introduction of a new Multi-Channel Signal Binning and Multiplexing (MCSBM) method and architecture. The proposed method achieves significant reductions in power consumption in comparison to a conventional time-division multiplexing quantizer, while adding only a modest amount of overhead and complexity. Among other advantages, the invention permits architects to fabricate MC integrated circuits with ultra low power consumption and small chip area, where conventional architectures could not. Another embodiment of the invention relates to the system's compressor organizing samples of the input signal in such a way that the downstream ADC quantizes the higher variance samples with a higher resolution compared to the resolution it uses to quantize other samples with lower variance.

22 Claims, 8 Drawing Sheets

1. Initialize $x_1, x_2, \ldots x_N \in \mathcal{U}$, and initialize $k=1$
2. Organize input signals into bins:
   for $n=1:1:N$
       if $x_n \in \mathcal{U}$
           for $m=1:1:N-n$
               if $|x_n - x_{n+m}| < V_{th}$ & $x_{n+m} \in \mathcal{U}$
                   $x_n, x_{n+m} \in \mathcal{C}_k$ and $x_n, x_{n+m} \notin \mathcal{U}$;
           end
       end
       if $\mathcal{C}_k \neq \{\ \}$
           $k = k + 1$;
       end
   end 3. Assign and multiply Hadamard codes to each bin of signals:
   for $k=1:1:K$
       assign $\mathcal{C}_k$ an $\mathbf{H}_{N_2 \times N_1}$ such that $N_k$ is the nearest Hadamard multiple rounded up from $C_k$;
       Pad $\mathcal{C}_k$ with its last element replicated $N_k - C_k$ times[†]
       so that $\mathbf{x}_{\mathcal{C}_k}$ becomes an $N_k \times 1$ vector;
       Obtained multiplexed output $\mathbf{x}_{CDM, \mathcal{C}_k} = \mathbf{H}_{N_2 \times N_1} \cdot \mathbf{x}_{\mathcal{C}_k}$;
   end
   Similarly, assign and multiply Hadamard codes to $\mathcal{U}$
   to obtain $\mathbf{x}_{CDM, \mathcal{U}} = \mathbf{H}_{N_\lambda \times U} \cdot \mathbf{x}_\mathcal{U}$;

4. Quantize $\mathbf{x}_{CDM, \mathcal{C}_k}$ and $\mathbf{x}_{CDM, \mathcal{U}}$ by allocating more bits to elements with high variance and fewer bits to elements with low variance;

5. Recover $\mathbf{x}_{\mathcal{C}_k}$ and $\mathbf{x}_\mathcal{U}$ using matched filters that multiply the quantized $\mathbf{x}_{CDM, \mathcal{C}_k}$ and $\mathbf{x}_{CDM, \mathcal{U}}$ by the inverse of each corresponding Hadamard code;

6. Reorganize recovered $\mathbf{x}_{\mathcal{C}_k}$ and $\mathbf{x}_\mathcal{U}$ to get recovered signals $\mathbf{x}$.

FIG. 4

[†] Replicating any element that is not the last element is also an option, and the overall $SQNR$ is simulated to be the same.

MULTI-CHANNEL CODE-DIVISION MULTIPLEXING IN FRONT-END INTEGRATED CIRCUITS

CROSS-REFERENCE TO RELATED APPLICATIONS

This application claims the benefit of U.S. Provisional Application No. 61/148,325, filed Jan. 29, 2009.

BACKGROUND OF THE INVENTION

1. Field of the Invention

The present invention relates generally to multi-channel systems, and more particularly to code-division multiplexed multi-channel systems.

2. Background Information

A multitude of applications require a front-end integrated circuit to manage multiple signals measured from different inputs. Examples of such multi-channel systems include: microelectrode arrays in neural recording, multi-antenna wireless communications, microarrays and lab-on-chips, X-ray detectors, electronic noses and gas sensor arrays, biosensor arrays, tactile sensors, ultrasound, cantilever arrays, multi-electrode electrocardiogram (ECG), and more. Even a generic architecture where multiple sensor outputs are processed by a single integrated circuit in industrial and medical applications falls under the category of a multi-channel system. Moreover, the emerging trend of miniature sensor arrays, which micro-electro-mechanical systems (MEMS) technology has enabled, is fueling the growing importance of low power, small form factor multi-channel integrated circuits.

A challenge of a multi-channel integrated circuit involves managing multiple input channels (which in some applications may range up to hundreds or even thousands of channels), while at the same time achieving reasonable amounts of power consumption and hardware size and complexity. In its most generic form, the multi-channel integrated circuit takes on the conventional architecture of FIG. 1, where multiple analog signal processing chains are dedicated to each input. However, several drawbacks accompany the brute-force replicated chain method: an increase in power consumption and chip area proportional to the number of inputs, an increase in I/O and control signals, coupling between multiple chains, difficulty in routing and distributing clock and global signals, and (non)systematic mismatches between the chains. Particularly, a critical bottleneck in multi-channel systems is the analog-to-digital converter (ADC), which, depending on the application, can easily dominate the overall power and area, especially when high resolutions and fast sampling speeds are needed. Consequently, not only does the conventional architecture increase design and debugging time, but in applications where ultra low power consumption and small chip area are the foremost goals, the architecture is prohibitively challenging One alternative is to time-division multiplex (TDM) multiple input signals to a single shared path of an amplifier and analog-to-digital converter (ADC) as shown in FIG. 2. Another alternative is code-division multiplexing (CDM).

SUMMARY

The embodiments provided herein are directed to code-division multiplexing multi-channel systems. The use of CDM in multi-channel front-end integrated circuits has significant power reduction advantages over that of TDM, especially in that of the ADC during the coding transform on correlated multi-channel signals. CDM's data compression advantages are further extended to uncorrelated and weakly correlated MC signals through a Multi-Channel Signal Binning and Multiplexing (MCSBM) method and architecture. The proposed method achieves significant reductions in power consumption in comparison to a TDM quantizer, while adding only a modest amount of overhead and complexity. In addition, an adaptive multi-channel CDM architecture is presented, where the built-in address code of each input signal is utilized to reduce overhead of the system. These CDM multi-channel architectures are described herein.

In one embodiment, a CDM multi-channel system receives multiple input signals and multiplies each input signal with a unique code to distinguish the input signal from the other input signals, and subsequently sums them together. If the code set is an orthogonal code set, such as a Hadamard transform, fast Fourier transform (FFT), discrete cosine transform (DCT), Karhunen-Loeve transform (KL), or the like, the code-multiplied, summed output is data compressed when the multi-channel input signals are correlated. The multiple input signals may originate from the same source, or from multiple antennas, multiple sensors, multiple channels, or the like. The code-modulated signals are then sent through a single path of shared blocks, which could provide amplification, filtering, pre-processing, or similar functions. The signals are then quantized by an analog-to-digital converter (ADC). After shared processing and/or shared transmission, the individual signals are recovered using a bank of matched filters. Each matched filter (MF) contains a code corresponding to one of the unique codes for recovering the corresponding signal from the combined signal. The recovered signals may then be inputted to additional processors for further processing.

In another embodiment a Multi-Channel Signal Binning and Multiplexing (MCSBM) method and architecture allow uncorrelated or weakly correlated signals to be Hadamard multiplexed and compressed. The method sorts the MC input signals into bins of similar amplitude. Each bin is then individually Hadamard multiplexed, compressed, and quantized, similar to the approach discussed in the first embodiment.

Another variation of the CDM multi-channel system is an adaptive multi-channel system, where in some applications certain input signals are inactive during a specified time interval. In this embodiment, only the active signals need to be processed to reduce the amount of output data and overhead. By using code-division multiplexing, an inherent address code of each input is already built into the code-modulation process, thereby obviating a need to put an additional address code on top of the input signal's measured value.

The previously mentioned embodiments can also be extended to a single-channel system. This is realized by transforming a single input signal into multiple input signals. The single input signal is sampled over time to collect N number of samples. Each of these samples then constitutes multiple signals which can be multiplexed, compressed, and quantized, similar to the approach discussed in each of the previous embodiments.

In yet another embodiment, the CDM architecture comprises a compressor, an ADC, and a decompressor, wherein the compressor function organizes samples of the input signal in such a way that the samples with higher variance are quantized by the ADC at higher resolution compared to the resolution at which the ADC quantizes the samples with lower variance. This embodiment can also be extended to a multi-channel system.

The systems, methods, features and advantages of the invention will be or will become apparent to one with ordinary skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention, including fabrication, structure and operation, may be gleaned in part by study of the accompanying figures, in which like reference numerals refer to like segments.

FIG. 4 shows the Multi-Channel Signal Binning and Multiplexing (MCSBM) method according to another embodiment of the invention.

DETAILED DESCRIPTION

Figure 1:
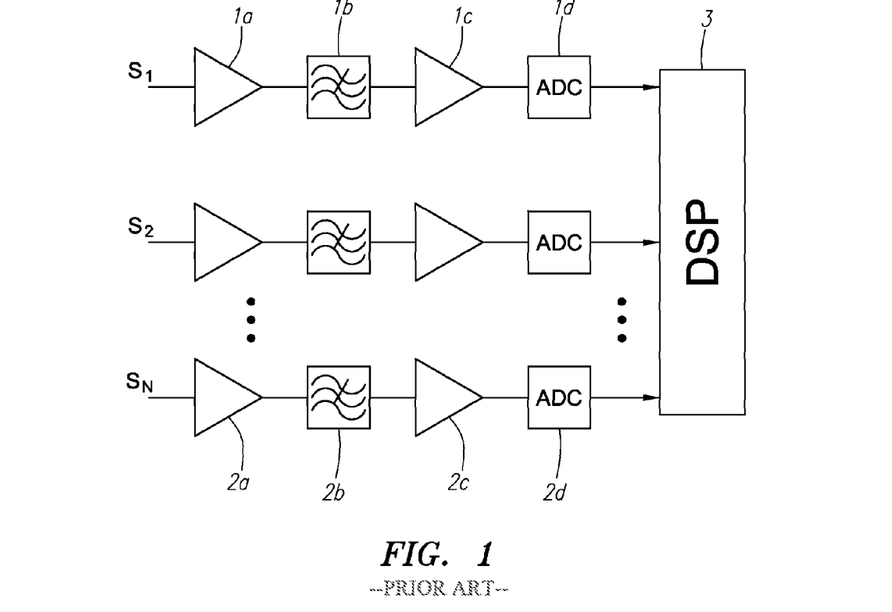
FIG. 1 shows a block diagram of a conventional multi-channel system with multiple analog signal processing chains.
Figure 2:
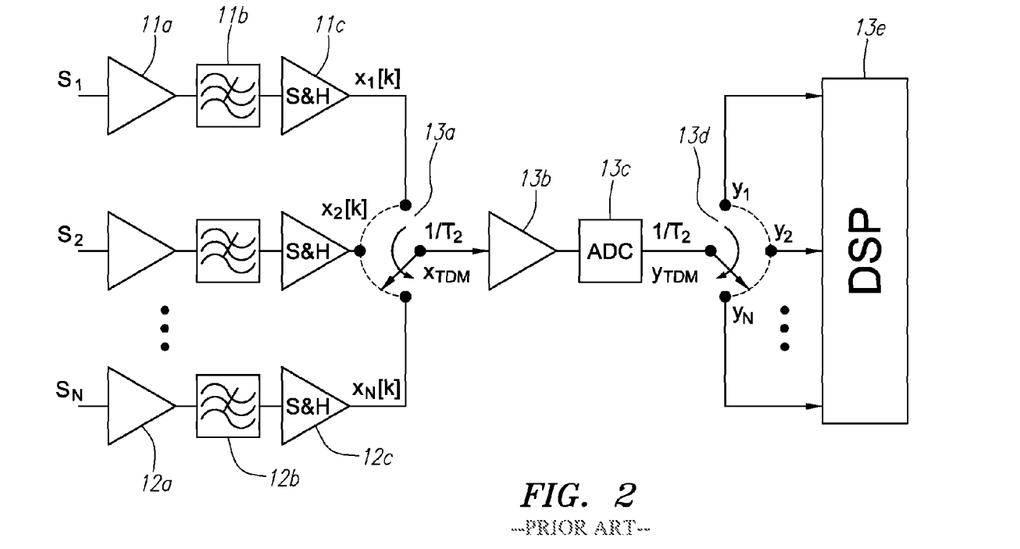
FIG. 2 shows a block diagram of a conventional time-division multiplexing multi-channel system.

FIG. 1 shows a block diagram of a conventional multi-channel system with multiple analog signal processing chains. One chain is dedicated to each input channel. The first input channel $S_1$ is transmitted through an amplifier or buffer $1a$. Thereafter it is sequentially passed through a low-pass filter $1b$, then another amplifier or buffer $1c$, and analog-to-digital converter (ADC) $1d$. The input channel is finally transmitted to the digital signal processor 3. This configuration is repeated for each input channel, from the first input channel $S_1$ through the N-th input channel $S_N$, the latter passing through its own amplifier or buffer $2a$, low-pass filter $2b$, second amplifier or buffer $2c$, and ADC $2d$ before reaching the digital signal processor 3.

FIG. 2 shows a block diagram of a conventional time-division multiplexed multi-channel system for processing a plurality of input signals. The first input channel $S_1$ is transmitted through an amplifier or buffer $11a$. Thereafter it is passed through a low-pass filter $11b$ before it arrives at a sample-and-hold block $11c$. This configuration is repeated for each input channel, from the first input channel $S_1$ through the N-th input channel $S_N$, the latter passing through its own amplifier or buffer $12a$, low-pass filter $12b$, and sample-and-hold block $12c$. The multiplexer $13a$ then multiplexes the samples of all N input signals onto a single stream at a certain sampling frequency, resulting in a vector $x_{TDM}$, which is output to the amplifier $13b$. The multiplexed stream is then quantized by the ADC $13c$, yielding $y_{TDM}$. The quantized signal is then transmitted to the demultiplexer $13d$, which synchronously resamples $y_{TDM}$ to recover the individual signals, $y_1$ through $y_N$. Subsequently those signals are sent to the digital signal processor $13e$.

Figure 3:
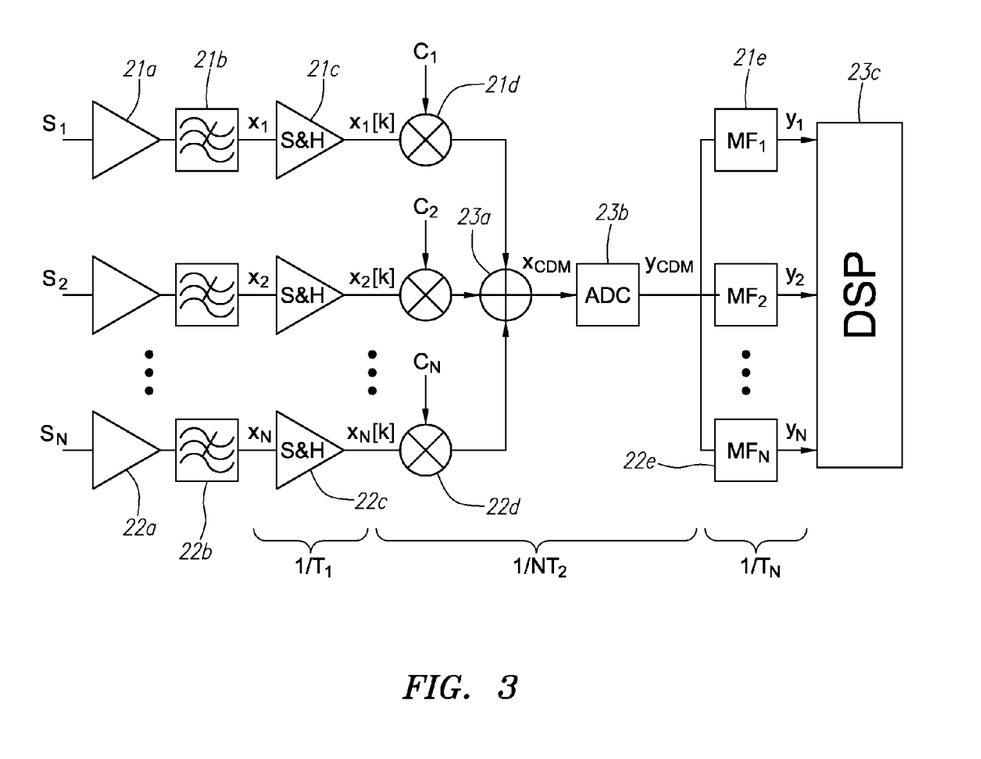
FIG. 3 shows a block diagram of a multi-channel code-division multiplexed system according to one embodiment of the invention.

FIG. 3 shows a block diagram of a code-modulated path-sharing multi-signal system for processing a plurality of input signals according to one embodiment. The signals $S_1$ through $S_N$ inputted into the system may originate from the same source, or from multiple antennas, multiple sensors, multiple channels or the like. The system comprises a plurality of amplifiers or buffers $21a$, $22a$, low-pass filters $21b$, $22b$, sample-and-hold blocks $21c$, $22c$, and code modulators $21d$, $22d$, wherein each code modulator receives one of the signals and modulates the corresponding signal with a unique code $C_1$ to $C_N$. The unique codes assigned to the code modulators can be either orthogonal (e.g., Hadamard) or non-orthogonal codes, of binary or M-ary complexity.

The multi-signal system further comprises a signal summer $23a$ that combines the N code-modulated signals from the code modulators into a combined signal $x_{CDM}$. As a result, the signals are multiplexed into the combined signal, within which each signal is distinguishable from the other signals by its unique code and can be recovered from the combined signal using the corresponding code. So as to not overload the full scale of a downstream ADC $23b$, the combined signal can be scaled down by the scalar $N^{-0.5}$.

The combined signal $x_{CDM}$ is sent through shared hardware and/or shared transmission medium. The shared hardware may include an amplifier, filter, or processors. The shared medium may include air, water, an optical fiber, a human body, a conductor such as a coaxial cable, wires or other shared conductive path. To transmit the combined signal across the shared medium, the system may include components for converting the combined signal into a form that can be transmitted across the shared medium. For example, when the shared medium is air, the system may include an RF antenna and associated hardware at each end of the shared medium.

The multi-signal system of FIG. 3 further comprises a plurality of matched filters that receive the combined signal at the other end of the shared hardware and/or shared medium. Each MF contains a code corresponding to one of the unique codes for recovering the corresponding signal from the combined signal. If a unique code had been an orthogonal matrix, then the inverse of that code matrix would be used as the corresponding code to recover that input signal. The first MF $21e$ contains the code corresponding to the unique code $C_1$ used by the code modulator $21d$ to code-modulate input signal $S_1$. Likewise, the N-th MF $22e$ contains the code corresponding to the unique code $C_N$ used by the code modulator $22d$ to code-modulate input signal $S_N$. Each recovered signal corresponds to one of the input signals, $y_1$ to $S_1$, $y_2$ to $S_2$, and $y_N$ to $S_N$. The recovered signals are then input into the digital signal processor 23c for further processing.

By multiplying the multi-channel input signal vector x with an N×N Hadamard matrix H, the signals are essentially decomposed into N transform coefficients associated with the row vectors of H. The Hadamard transformed output is $x_{CDM}$, an N×1 vector which represents the single stream CDM signal. Viewed this way, the Hadamard transform is synonymous with the Fourier transform, where the magnitudes of the frequencies within a signal vector are binned by its transform coefficients.

For correlated MC signals, the first few low frequency transform coefficients typically have the greatest power. Because the elements of $x_{CDM}$ have unequal powers and degrees of importance, the possibility of quantizing different elements with varying levels of resolution can lead to power savings for the ADC, since only the higher power elements needed to be quantized finely, and that of low power can be quantized coarsely (i.e. fewer number of bits needs be allocated to quantizing certain elements). As such, Hadamard transforms provide the opportunity to compress redundant information among the signals, resulting in lowered data rates and quantization resolutions.

Also, while the use of a non-orthogonal code matrix can cause distortion to the multiplexed inputs, the use of a carefully selected code matrix can minimize the distortion. The use of an M×N code matrix (where M<N) in CDM can still maintain acceptable distortion while requiring lower operating rates of the shared blocks, ultimately reducing the power consumption of those blocks.

The multi-signal system can be used for any application that requires processing and/or transmitting multiple signals. For example, the system may be used to process multiple signals using shared hardware instead of separate signal chains. This greatly reduces the size, power consumption, and complexity of the system, especially in applications using a large number of signals. This also reduces complexity by eliminating the coupling between components in multiple signal chains. Moreover, the shared signal path of the combined signal alleviates the problem of complex signal distribution and routing in multi-signal architectures.

FIG. 4 shows the Multi-Channel Signal Binning and Multiplexing (MCSBM) method according to one embodiment. The MCSBM method further improves the data compression characteristics of Hadamard multiplexing. It extends compression advantages onto even weakly correlated or uncorrelated MC signals, while further enhancing the compression properties of highly correlated signals. The method sorts the multi-channel input signals into mutually exclusive bins of similar amplitude. Each bin is then individually Hadamard multiplexed, compressed, and quantized, similar to the approach discussed for FIG. 3.

The following are notations and assumptions for the MCSBM method of FIG. 4, which depicts the case when the multi-channel input signal vector is $x=[x_1 x_2 \Lambda x_N]$ signals, wherein the $e_k$ denotes the $k^{th}$ bin containing $C_k$ number of sorted signals, for k=1, 2, Λ, K; wherein $e_u$ denotes the single bin containing U number of uncorrelated or unsorted signals; $x^u$ denotes the vector of signals in $e_k$ and $x^u$ denotes the vector of signals in $u$. Every bin is mutually exclusive with each other, meaning that a signal in a bin cannot occupy any other bin simultaneously. $V_{th}$ represents the threshold voltage used to determine that amount of correlation between signals of a bin. Furthermore, $C_k$ and U are subject to the constraint $$N = U + \sum_{k=1}^{K} C_k$$

Figure 5:
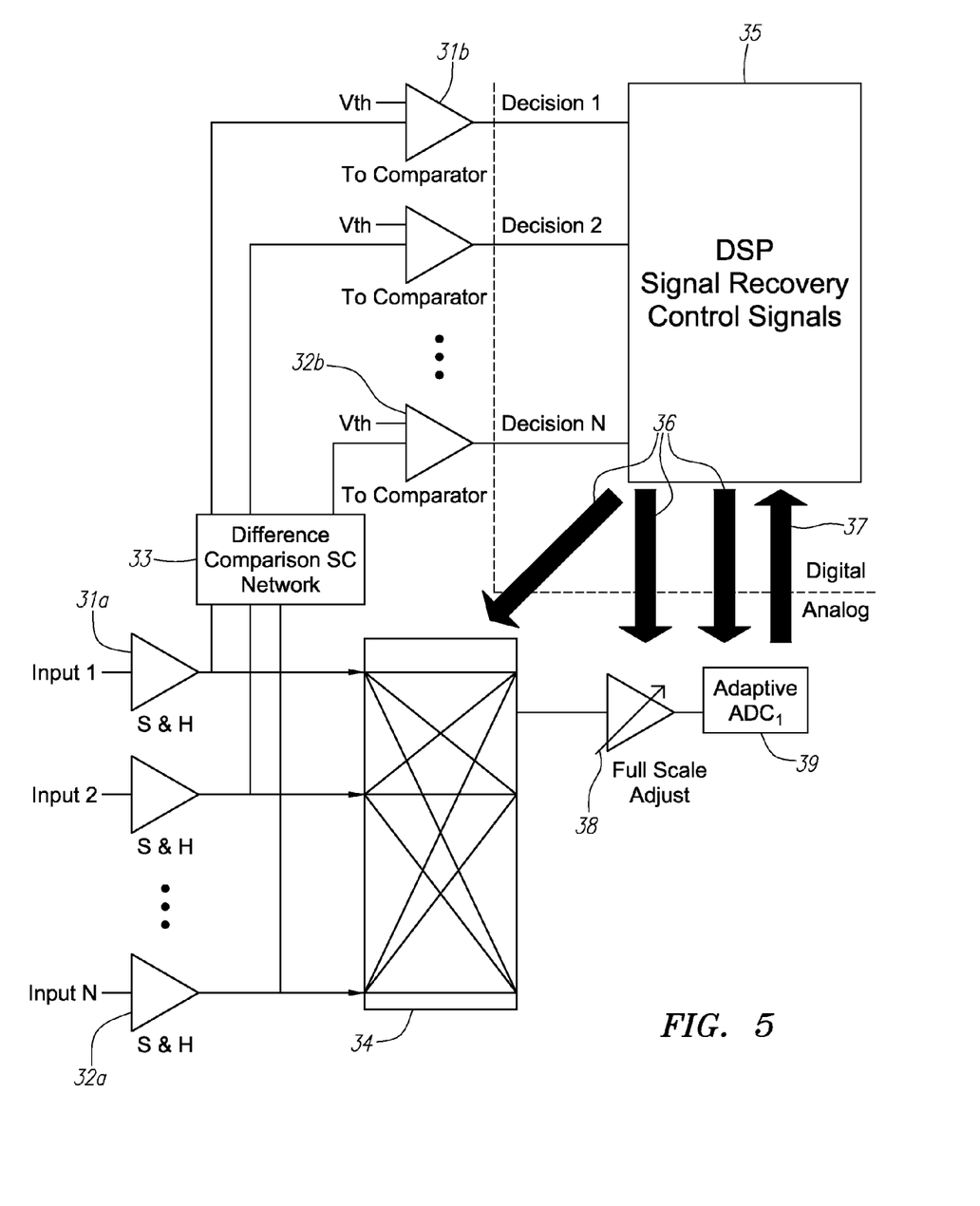
FIG. 5 shows the Multi-Channel Signal Binning and Multiplexing (MCSBM) architecture, using a single adaptive analog-to-digital converter, according to another embodiment of the invention.

The MCSBM architecture using a single adaptive ADC is shown in FIG. 5. After the input sample and holds 31a, 32a, the difference comparison network 33 compares the difference between input signals, $|x_n - x_{n+m}|$, as reflected by step 2 of the method of FIG. 4. The difference comparison network 33 can be realized with switched capacitor circuits. Moreover, by building in switched capacitor operation into the comparators, the subtraction and thresholding procedure of step 2 of the method can be realized with minimum added overhead.

As part of step 2 of the MCSBM method of FIG. 4, the differences are then sent to 1-bit comparators 31b, 32b, which each decides whether $|x_n - x_{n+m}| < V_{th}$. Once the decision has been made, knowledge of which signals fall into which bin, $e_1, e_2, \Lambda, e_k$ or $u$, are recorded in the digital signal processor 35. A priori knowledge of the MC input signals can be used to store quantizer settings in look up tables (LUT) in the digital signal processor 35, which accordingly provides quantizer control signals 36 to different elements of the Hadamard multiplexed outputs. The control signals 36 may be digital, to be determined by the information on the multi-channel input signal amplitude differences.

Note that as $V_{th}$, normalized as a fraction of the full scale of the ADC 39, increases, the average bin size for $e_k$ ($C_k$) also increases. Conversely the average bin size for $u$ (U) decreases as $V_{th}$ increases. The trends of the average U versus $V_{th}$ is independent of N. In addition, the average number of bins for $e_k$ (K) decreases as $V_{th}$ decreases. Furthermore, the variance among the signals in a bin also decreases as $V_{th}$ decreases. The average variances determine how much variable gain is needed for different Hadamard multiplexed output elements to amplify them to the full scale of the ADC.

Based on the above information, digital control signals 36 select the appropriate setting in the Hadamard selector-and-multiplexer 34, and each bin is Hadamard multiplexed together accordingly. This is reflected by step 3 of the method of FIG. 4. The multiplexing step also includes multiplying the $u$ bin that contains U number of uncorrelated or unsorted signals.

The knowledge of which signals are contained in which bins also controls the full scale variable gain amplifier 38 and/or the speed and resolution settings of the ADC 39 via control signals 36. As reflected by step 4 of the method, each of the bins is quantized by one or more ADCs that have been set to operate at optimal resolutions determined by the information. Elements with lower variance may be quantized at lower resolutions, and thus fewer bits needs be allocated to those elements. Conversely elements with higher variance should be quantized at higher resolutions, and thus more bits should be allocated to those elements.

The digitized signals are output via 37 from the ADC 39 are then matched filtered as per step 5, and subsequently reorganized in step 6 into its original signal vector x based on which signals were allocated into which bins. The reorganized signals may then be sent to the digital signal processor 35 for further processing.

The MCSBM architecture enables significant amounts of power savings compared to a conventional TDM quantizer.

Power savings for a targeted signal to quantization noise ratio (SNQR) degradation increases as correlation increases. At high correlations, power savings can be attained at no degradation in SNQR. Furthermore, the power savings afforded by MCSBM will increase as the number of channels increases.

Although the method of FIG. 4 employs Hadamard codes, non-Hadamard orthogonal codes, non-orthogonal codes, binary codes, or M-ary codes may also be used.

Figure 6:
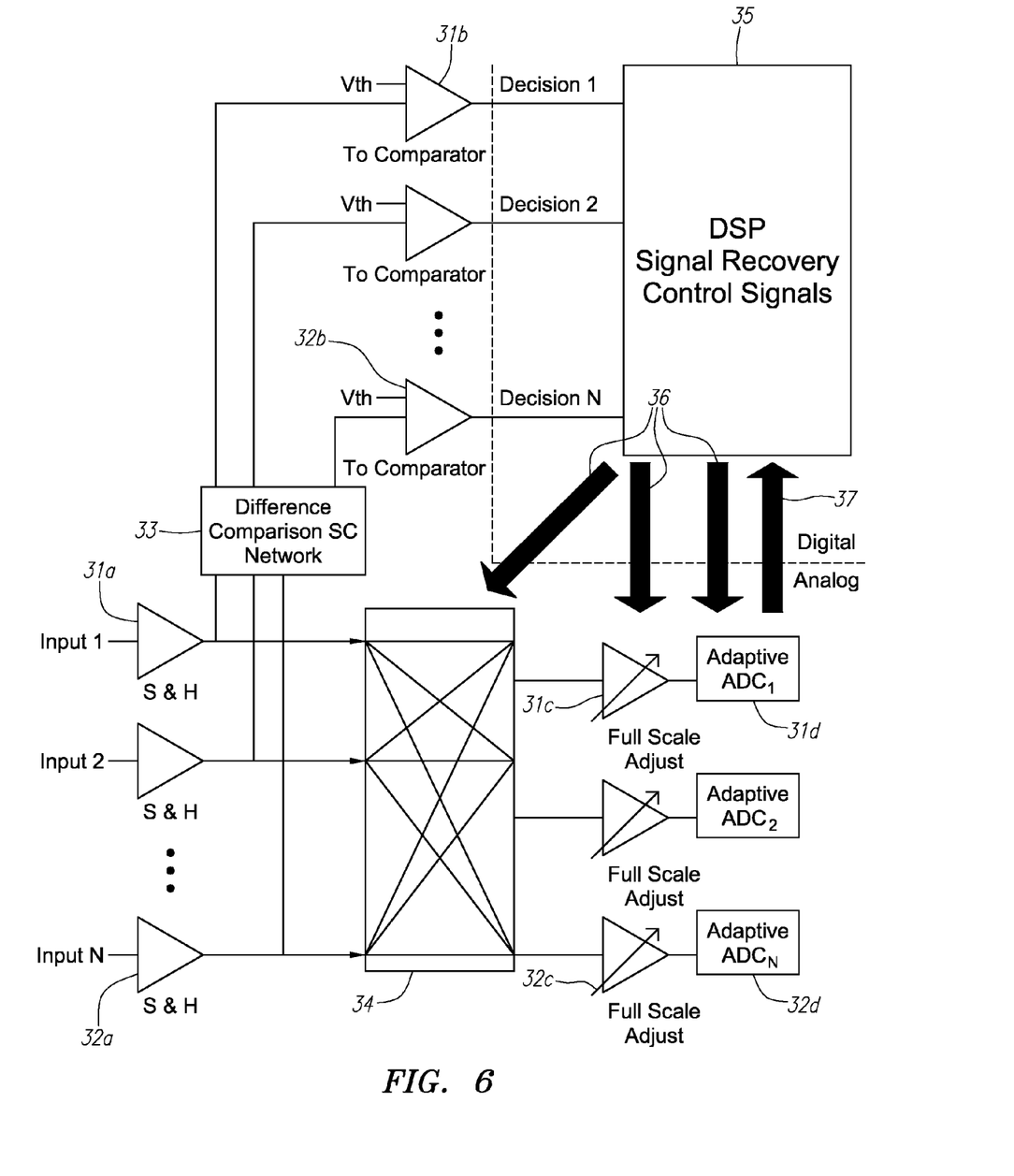
FIG. 6 shows the Multi-Channel Signal Binning and Multiplexing (MCSBM) architecture, using a multiple adaptive or non-adaptive analog-to-digital converters, according to another embodiment of the invention.

FIG. 6 shows the MCSBM architecture using multiple adaptive or fixed ADCs. Its operation is very similar to that of FIG. 5, except the CDM multi-channel input signals are quantized using multiple ADCs 31d, 32d. The ADCs 31d, 32d are either adaptive in its resolution and/or bandwidth, or fixed in its resolution and/or bandwidth. This architecture relaxes the speed requirements of the quantization process. By breaking down Hadamard multiplexing into sub-ADCs 31d, 32d, data compression advantages are still retained since the sub-ADCs 31d, 32d are operating at resolutions optimized for the transform coefficients to be quantized. Each of the multiple ADCs 31d, 32d may have its own variable gain amplifier 31c, 32c to adjust to the incoming signal to the ADC's full scale.

Figure 7:
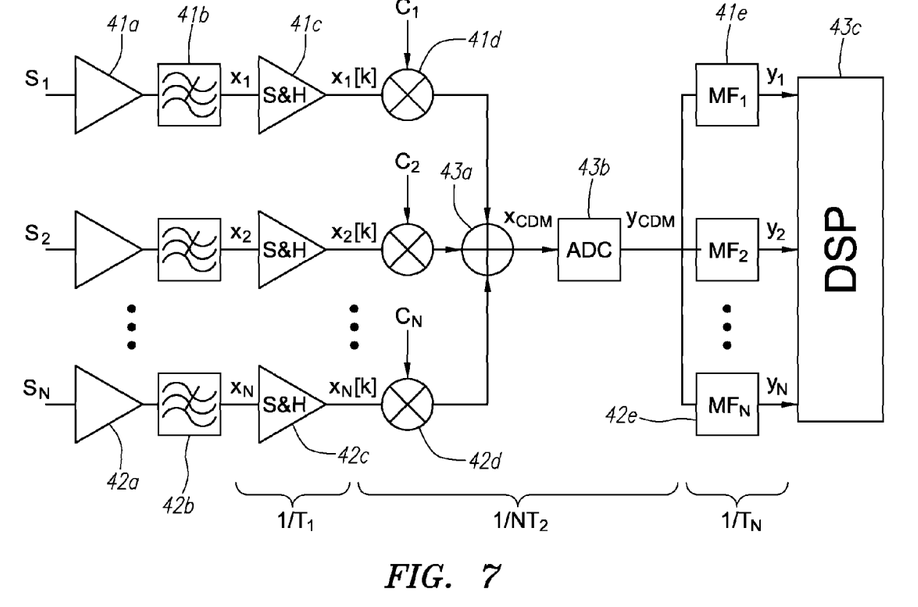
FIG. 7 shows the adaptive multi-channel code-division multiplexed system according to another embodiment of the invention.

FIG. 7 shows an adaptive multi-channel CDM system. This variation of the CDM multi-channel system is an adaptive multi-channel system, where in some applications certain input signals are inactive during a specified time interval. In this embodiment, only the active signals need to be processed to reduce the amount of output data and overhead. By using code-division multiplexing, an inherent address code of each input is already built into the code-modulation process, thereby obviating a need to put an additional address code on top of the input signal's measured value.

The signals $S_1$ through $S_N$ inputted into the system may originate from the same source, or from multiple antennas, multiple sensors, multiple channels or the like. The system comprises a plurality of amplifiers or buffers 41a, 42a, low-pass filters 41b, 42b, sample-and-hold blocks 41c, 42c, and code modulators 41d, 42d, wherein each code modulator receives one of the signals and modulates the corresponding signal with a unique code $C_1$ to $C_N$.

When an input signal $S_1$ is inactive, or when it is not desired to know the signal's value, its corresponding code modulator 41d is shut down. The remaining active or desired input signals such as $S_N$ are code-division multiplexed by its respective code modulator 42d, subsequently summed with other code-division multiplexed signals at the summer 43a, and thereafter transmitted through a single path of shared blocks or medium. So as to not overload the full scale of the downstream adaptive ADC 43b, the combined signal $x_{CDM}$ can be first scaled down by the scalar $N^{-0.5}$. The combined signal $x_{CDM}$ is then quantized by the adaptive ADC 43b, where its speed and resolution are adaptively adjusted based on the number and locations of the active input signals. In the digital domain, a plurality of matched filters 41e, 42e receive the quantized combined signal $y_{CDM}$ at the other end of the shared hardware and/or shared medium. Each MF contains a code corresponding to one of the unique codes for recovering the corresponding signal from the combined signal. For instance, MF 42e contains a code corresponding to the unique code $C_N$ used by code modulator 42d, which can recover the signal $y_N$ from the combined signal $y_{CDM}$. Each recovered signal corresponds to one of the input signals. The recovered signals may be inputted thereafter into additional signal processors 43c for further processing.

Figure 8:
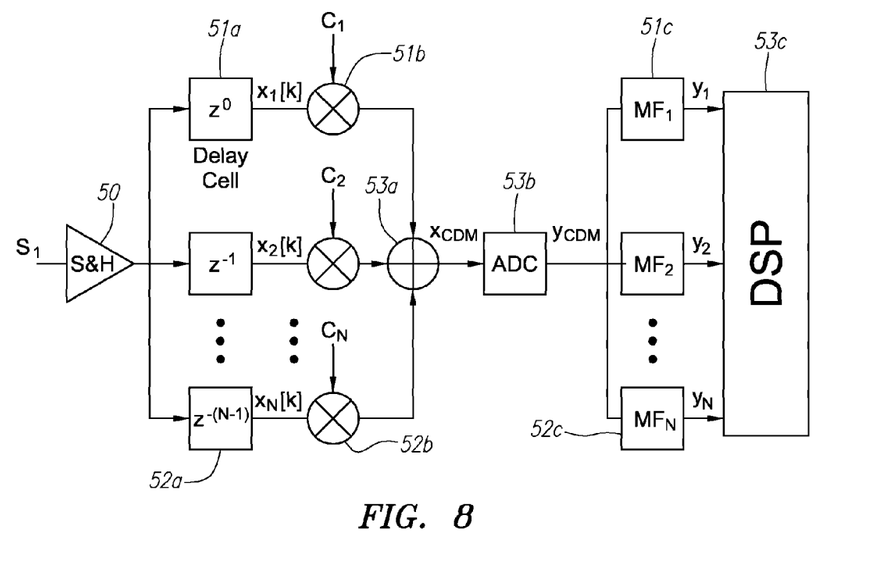
FIG. 8 shows the single-channel conversion to a multi-channel system according to another embodiment of the invention.

FIG. 8 shows a single-channel conversion to a multi-channel system. This method may be applied to any of the aforementioned architectures of FIGS. 3, 5, 6 and 7. The single input channel $S_1$ is sampled and held sequentially by a sample-and-hold block 50. A first delay block or cell 52a will delay the multiplexing process of its sample by N−1 clock cycles, the second by N−2 clock cycles, and so forth. The N-th delay block or cell 51a need not perform any delay. In other words, the first and last delay cells will differ by N−1 clock cycles. This allows a group of sampled signals to be code-division multiplexed 51b, 52b and summed together at 53a, thereby attaining similar advantages of FIGS. 3, 5, 6 and 7 upon quantization at ADC 53b and recovery at matched filters 51c, 52c. The recovered signals may be inputted thereafter into a digital signal processor 53c for further processing.

Figure 9:
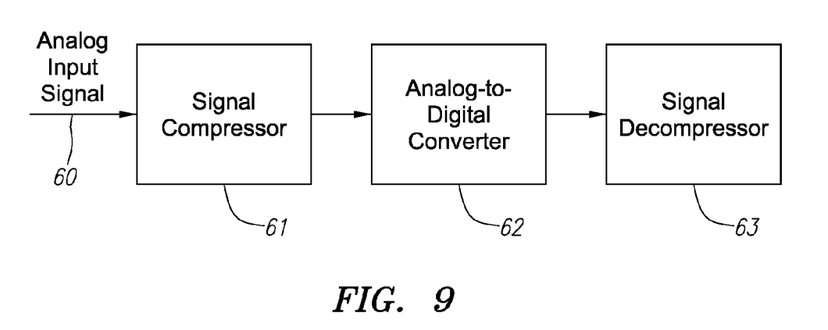
FIG. 9 shows the compression-decompression analog-to-digital converter system block diagram according to another embodiment of the invention.

FIG. 9 shows a block diagram of a compression-decompression system surrounding an ADC 62 according to another embodiment. The analog signal(s) 60 inputted into the system may originate from multiple antennas, multiple sensors, multiple channels or the like, or from the same source. The analog input signal 60 is directed through a signal compressor 61, the ADC 62, and a signal decompressor 63.

Figure 10:
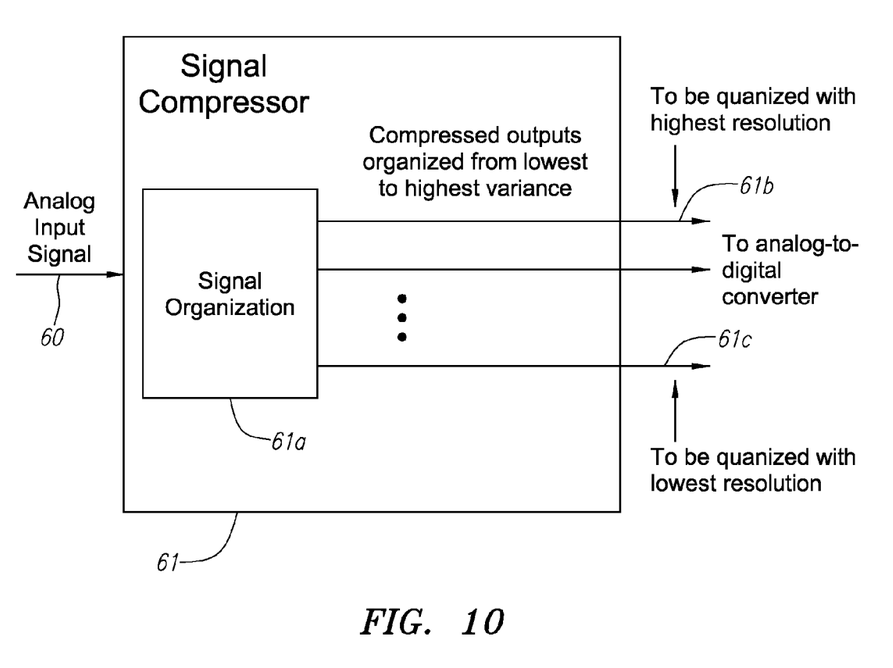
FIG. 10 shows the compressor function in the compression-decompression analog-to-digital converter system.

FIG. 10 shows a block diagram of the compressor 61. The compressor 61 plays the role of organizing or reshaping the sampled signals such that output samples of the compressor with higher variance 61b are subsequently quantized by the ADC 62 of FIG. 9 at a higher resolution compared to those output samples 61c with lower variance, which are quantized at a lower resolution. The compressor signal organization at 61a can be performed in a variety of ways, including rearranging samples based on their amplitude information, the frequency information, or some other information such as that attained after a linear transformation. This then enables the ADC 62 of FIG. 9 to operate with lower total resolution overall when using compression compared to that without using compression. After the compressed signal is digitized, the signal must be decompressed so that it will closely resemble the original uncompressed signal with minimal signal-to-noise ratio loss.

Figure 11:
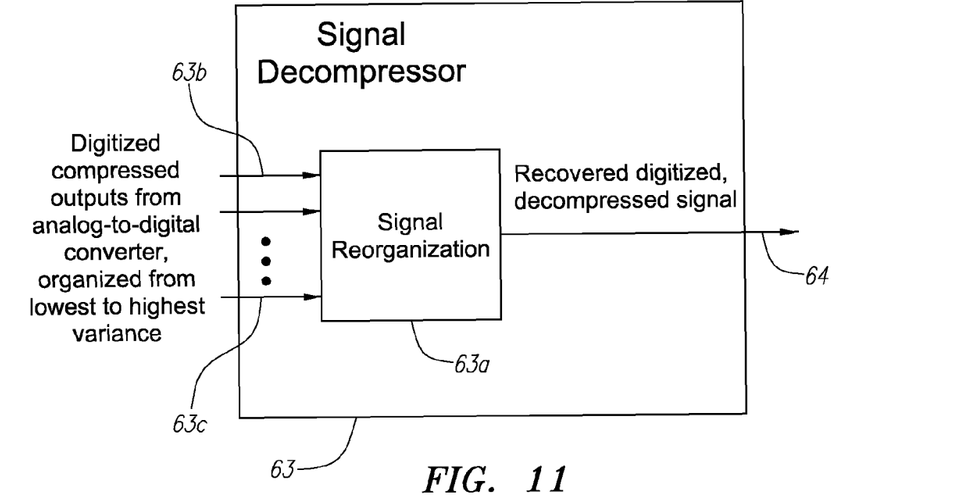
FIG. 11 shows the decompressor function in the compression-decompression analog-to-digital converter system.

FIG. 11 shows a block diagram of the decompressor 63. The decompressor 63 performs the inverse or opposite function of the compressor 61 in order to get the original signal back. The decompressor's signal re-organization at 63a can be performed in a variety of ways, including rearranging samples 63b, 63c based on their amplitude information, the frequency information, or some other information such as that attained after a linear transformation. The reorganization section 63a may comprise summers or subtracting operations for reconstructing the original signal from the samples 63b, 63c. A reconstructed signal 64 is then output from the decompressor 63.

Figure 12:
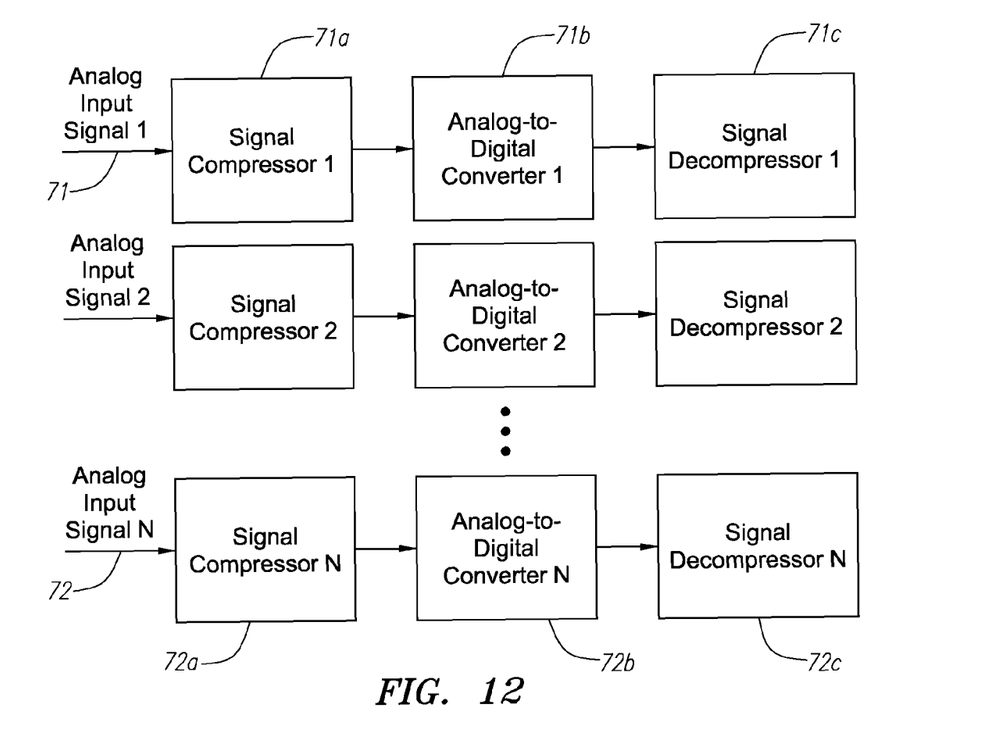
FIG. 12 shows the compression-decompression analog-to-digital converter system used in a multi-channel system.

FIG. 12 shows how the compression-decompression analog-to-digital converting system can be applied to a multi-channel system. In one embodiment, multi-channel system application is accomplished by employing multiple compressors 71a, 72a, analog-to-digital converters 71b, 72b, and decompressors 71c, 72c (i.e., a compressor-ADC-decompressor chain for receiving and quantizing each input channel 71, 72 in the multi-channel system).

While the invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A multi-channel signal system, comprising:
   a plurality of code modulators for receiving a plurality of input signals, wherein each code modulator modulates with a unique code one of said plurality of input signals to output a code-modulated signal;

a signal summer coupled to each of said plurality of code modulators that combines the code-modulated signals into a combined signal;

a shared processing block coupled to the signal summer for processing the combined signal;

a plurality of matched filters coupled to the shared processing block, wherein each matched filter includes a code corresponding to one of the unique codes for recovering the corresponding input signal from the combined signal;

an initial sample-and-hold block that sequentially samples and holds a single input channel and outputs one of N number of samples of the single input channel to each of N number of delay blocks, coupled to said sample-and-hold block;

wherein the n-th delay block delays the multiplexing process of its output sample by N−n clock cycles; and wherein said plurality of delay blocks output the plurality of input signals for receipt by the plurality of code modulators.

2. A multi-channel signal system, comprising:

a plurality of code modulators for receiving a plurality of input signals, wherein each code modulator modulates with a unique code one of said plurality of input signals to output a code-modulated signal; wherein each code modulator also turns on or off depending on its input signal's activity;

a signal summer coupled to each of said plurality of code modulators that combines the code-modulated signals into a combined signal;

a shared processing block coupled to the signal summer for processing the combined signal;

a plurality of matched filters coupled to the shared processing block, wherein each matched filter includes a code corresponding to one of the unique codes for recovering the corresponding input signal from the combined signal; and an analog-to-digital converter with adaptable resolution and bandwidth based on the number and locations of the active input signals, that quantizes the combined signal from the shared processing block and outputs the quantized combined signal to the plurality of matched filters for recovery of the original input signals.

3. The multi-channel signal system of claim 2, further comprising:

an initial sample-and-hold block that sequentially samples and holds a single input channel and outputs one of N number of samples of the single input channel to each of N number of delay blocks, coupled to said sample-and-hold block;

wherein the n-th delay block delays the multiplexing process of its output sample by N−n clock cycles; and wherein said plurality of delay blocks output the plurality of input signals for receipt by the plurality of code modulators.

4. A multi-channel signal binning and multiplexing system, comprising:

a plurality of sample-and-hold blocks for receiving a plurality of input signals;

a difference comparison network, coupled to the sample-and-hold blocks, that extracts the difference in signal amplitude between the input signals;

a plurality of comparators, coupled to the difference comparison network, that provides information on whether or not the differences in signal amplitude exceed a settable threshold voltage;

a Hadamard multiplexer-and-selector, coupled to the sample-and-hold blocks, that code-division multiplexes each of a plurality of bins containing one or more of the input signals based on the information on the multi-channel input signal amplitude differences, and outputs a code-division multiplexed output signal; wherein each said bin is a mutually exclusive subset of the plurality of input signals;

an analog-to-digital converter that quantizes the code-division multiplexed output signal;

a plurality of matched filters, coupled to the analog-to-digital converter, that demultiplex the quantized code-division multiplexed output signals; and a signal reorganizer, coupled to the matched filters, that sorts the output signals of the matched filter to achieve the recovered multi-channel input signals.

5. The multi-channel signal binning and multiplexing system of claim 4, wherein said analog-to-digital converter quantizes one or more code-division multiplexed output signals with high variance at a first resolution, and quantizes one or more code-division multiplexed output signals with lower variance with a second resolution lower than that of the first resolution.

6. The multi-channel signal binning and multiplexing system of claim 4, further comprising:

a variable gain amplifier, coupled to the analog-to-digital converter, that adjusts the code-division multiplexed output signal to the desired scale of the analog-to-digital converter.

7. The multi-channel signal binning and multiplexing system of claim 6, wherein said analog-to-digital converter quantizes one or more code-division multiplexed output signals with high variance at a first resolution, and quantizes one or more code-division multiplexed output signals with lower variance with a second resolution lower than that of the first resolution.

8. The multi-channel signal binning and multiplexing system of claim 4, further comprising:

an initial sample-and-hold block that sequentially samples and holds a single input channel and outputs one of N number of samples of the single input channel to each of N number of delay blocks, coupled to said sample-and-hold block;

wherein the n-th delay block delays the multiplexing process of its output sample by N−n clock cycles; and wherein said plurality of delay blocks output the plurality of input signals for receipt by the plurality of sample-and-hold blocks.

9. The multi-channel signal binning and multiplexing system of claim 8, wherein said analog-to-digital converter quantizes one or more code-division multiplexed output signals with high variance at a first resolution, and quantizes one or more code-division multiplexed output signals with lower variance with a second resolution lower than that of the first resolution.

10. The multi-channel signal binning and multiplexing system of claim 8, further comprising:

a variable gain amplifier, coupled to the analog-to-digital converter, that adjusts the code-division multiplexed output signal to the desired scale of the analog-to-digital converter.

11. The multi-channel signal binning and multiplexing system of claim 10, wherein said analog-to-digital converter quantizes one or more code-division multiplexed output signals with high variance at a first resolution, and quantizes one or more code-division multiplexed output signals with lower variance with a second resolution lower than that of the first resolution.

12. A compression-decompression analog-to-digital converter system, comprising:
at least one signal compressor for receiving one or more input signals and outputting samples of said input signals to one or more analog-to-digital converters;
wherein each said compressor's output sample signals are organized based on their variance;
wherein each said analog-to-digital converter quantizes any higher variance output sample signals with higher resolution than the resolution at which it quantizes any output sample signals with lower variance; and
a signal decompressor coupled to each said analog-to-digital converter, that receives one or more quantized output sample signals therefrom, re-organizes said one or more quantized output sample signals, and reconstructs said one or more quantized output sample signals into a reconstructed signal.

13. A multi-channel signal binning and multiplexing method, comprising the steps of:
organizing each from a plurality of input signals into one from a plurality of bins of similar amplitude, determined by a settable threshold voltage difference between the input signals' amplitudes;
modulating each resulting bin of input signals with a unique code to output a corresponding bin containing code-modulated output signals;
quantizing each bin of code-modulated output signals according to variance of the signals contained therein;
recovering each bin of input signals by demodulating the quantized code-modulated output signals with a code corresponding to the unique code by which each bin was modulated; and
reorganizing the recovered signals to get the original multi-channel input signals.

14. The multi-channel signal binning and multiplexing method of claim 13, wherein one or more unique codes used in the modulating step is a binary code.

15. The multi-channel signal binning and multiplexing method of claim 13, wherein one or more unique codes used in the modulating step is a M-ary code.

16. The multi-channel signal binning and multiplexing method of claim 13, wherein the modulating step is performed by multiplying each bin of input signals with a non orthogonal matrix to output a corresponding bin containing code-modulated output signals.

17. The multi-channel signal binning and multiplexing method of claim 13, wherein the modulating step is performed by multiplying each bin of input signals with an orthogonal matrix to output a corresponding bin containing code-modulated output signals.

18. The multi-channel signal binning and multiplexing method of claim 17, wherein the
orthogonal matrix used in the modulating step is a Hadamard matrix.

19. A compression-decompression analog-to-digital converting method, comprising the steps of:
sampling one or more received input signals;
organizing each sample based on its variance;
quantizing from analog into digital form one or more samples with high variance at a first resolution;
quantizing from analog into digital form one or more samples with lower variance than those with high variance, with a second resolution different from that of the first resolution;
re-organizing the quantized samples.

20. The compression-decompression analog-to-digital converting method of claim 19, further comprising a step for reconstructing the re-organized quantized samples into a reconstructed signal.

21. The compression-decompression analog-to-digital converting method of claim 19, wherein the second resolution in the second quantizing step is lower than the first resolution in the first quantizing step.

22. The compression-decompression analog-to-digital converting method of claim 21, further comprising a step for reconstructing the re-organized quantized samples into a reconstructed signal.

* * * * *